US012686736B2

(12) United States Patent
Takeuchi

(10) Patent No.: US 12,686,736 B2
(45) Date of Patent: Jul. 21, 2026

(54) COMPOSITE MATERIAL AND MOLDED COMPOSITE MATERIAL

(71) Applicant: RIMTEC Corporation, Tokyo (JP)

(72) Inventor: Masaki Takeuchi, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 92 days.

(21) Appl. No.: 18/651,899

(22) Filed: May 1, 2024

(65) Prior Publication Data

US 2024/0287234 A1 Aug. 29, 2024

Related U.S. Application Data

(62) Division of application No. 15/734,328, filed as application No. PCT/JP2019/022388 on Jun. 5, 2019, now Pat. No. 12,012,474.

(30) Foreign Application Priority Data

Jun. 7, 2018 (JP) ................................ 2018-109480

(51) Int. Cl.
*C08F 279/00* (2006.01)
*C08J 5/24* (2006.01)

(52) U.S. Cl.
CPC ............. *C08F 279/00* (2013.01); *C08J 5/243* (2021.05); *C08J 5/244* (2021.05); *C08J 5/247* (2021.05); *C08J 5/248* (2021.05); *C08J 2351/00* (2013.01)

(58) Field of Classification Search
CPC .......... C08F 279/00; C08J 5/248; C08J 5/247; C08J 5/243; C08J 5/244; C08J 2351/00
USPC .......................................................... 523/202
See application file for complete search history.

(56) References Cited

U.S. PATENT DOCUMENTS

| | | | |
|---|---|---|---|
| 5,063,103 | A | 11/1991 | Sugawara et al. |
| 5,424,021 | A | 6/1995 | Nakade et al. |
| 2011/0237718 | A1 | 9/2011 | Yoshiwara |
| 2017/0037202 | A1 | 2/2017 | Takeuchi |
| 2017/0233538 | A1 | 8/2017 | Drozdzak Matusiak et al. |
| 2017/0275429 | A1 | 9/2017 | Dijt et al. |
| 2018/0022882 | A1 | 1/2018 | Kamei |

FOREIGN PATENT DOCUMENTS

| | | | | |
|---|---|---|---|---|
| JP | H01-319538 A | 12/1989 | | |
| JP | H04-357010 A | 12/1992 | | |
| JP | H11-322957 A | 11/1999 | | |
| JP | 2012097165 A * | 5/2012 | | C08J 5/24 |
| JP | 2017-524067 A | 8/2017 | | |
| KR | 10-2015-0051787 A | 5/2015 | | |
| KR | 10-2016-0125146 A | 10/2016 | | |
| WO | 99/58592 A1 | 11/1999 | | |
| WO | 01/60903 A1 | 8/2001 | | |
| WO | 03/062253 A1 | 7/2003 | | |
| WO | 2004/009507 A1 | 1/2004 | | |
| WO | 2010/044461 A1 | 4/2010 | | |
| WO | 2015/098636 A1 | 7/2015 | | |
| WO | 2016/152623 A1 | 9/2016 | | |

OTHER PUBLICATIONS

Mori et al., JP 2012-097165 A machine translation in English, May 24, 2012. (Year: 2012).*
International Search Report dated Jul. 30, 2019, issued in counterpart International Application No. PCT/JP2019/022388 (2 pages).
International Preliminary Report on Patentability (Form PCT/IB/373) issued in counterpart International Application No. PCT/JP2019/022388 dated Dec. 8, 2020, with Form PCT/ISA/237. (7 pages).
Extended (Supplementary) European Search Report dated Mar. 16, 2022, issued in counterpart EP application No. 19814104.6. (9 pages).
Office Action dated Dec. 19, 2023, issued in counterpart EP application No. 19 814 104.6. (11 pages).
Non-Final Office Action dated Jun. 15, 2023, issueed in U.S. Appl. No. 15/734,328.
Final Office Action dated Nov. 22, 2023, issueed in U.S. Appl. No. 15/734,328.
Office Action dated Apr. 23, 2026, issued in counterpart CN Application No. 201980035509.0, with English translation. (10 pages).
Tongkao, X., Practical technologies for modifying plastics, China Light Industry Press, 1st edition, p. 147, 2012 (3 pages); Cited in CN Office Action dated Apr. 23, 2026 and english summary of the relevant teaching found therein.
Jiakang, H. et al., Composite Material Molding Technology, Chemical Industry Press, 1st edition, p. 346-349, 1999(5 pages); Cited in CN Office Action dated Apr. 23, 2026 and english summary of the relevant teaching found therein.

* cited by examiner

*Primary Examiner* — David T Karst
(74) *Attorney, Agent, or Firm* — WHDA, LLP

(57) ABSTRACT

A composite material obtained by impregnating a fibrous filler to which a hydrocarbon-based resin is attached with a polymerizable composition containing a cycloolefin monomer and a metathesis polymerization catalyst is provided. According to the present invention, it is possible to provide a composite material which has no impregnation unevenness and can give a composite material molded article having excellent strength.

8 Claims, No Drawings

COMPOSITE MATERIAL AND MOLDED COMPOSITE MATERIAL

CROSS-REFERENCE TO RELATED APPLICATIONS

This application is a divisional of U.S. Pat. No. 5,734,328, filed on Dec. 2, 2020, which is a 371 of Internationa 1 Application No. PCT/JP2019/022388, filed on Jun. 5, 2019, which i s based upon and claims the benefit of priority from the prior Japan ese Patent Application No. 20118-109480, filed on Jun. 7, 2018, the entire contents of which are incorporated herein by reference.

TECHNICAL FIELD

The present invention relates to a composite material and a composite material molded article obtained by curing the composite material.

BACKGROUND ART

Recently, a polymer composed of a polymerizable composition containing a cycloolefin monomer and a metathesis polymerization catalyst, which is excellent in high strength and low void property, has been used as a matrix resin of a composite material molded article (refer to Patent Documents 1,2).

RELATED ART

Patent Documents

Patent Document 1: International Publication No. WO 2010/044461

Patent Document 2: International Publication No. WO 2015/098636

SUMMARY OF THE INVENTION

Problem to be Solved by the Invention

However, a polymerizable composition containing a cycloolefin monomer and a metathesis polymerization catalyst has low affinity to an ordinary resin material which is used to be previously adhered to a fibrous filler for the purpose of preforming, and when such a resin material is used, impregnate unevenness is occurred when such a polymerizable composition is impregnated, and a composite material molded article obtained using such a composite material may be inferior in strength.

It is an object of the present invention to provide a composite material which has no impregnation unevenness and can give a composite material molded article having excellent strength.

Means for Solving the Problem

The present inventor has studied to achieve the above object, as a resin to be previously adhered to a fibrous filler, a hydrocarbon-based resin is used, and a polymerizable composition containing a cycloolefin monomer and a metathesis polymerization catalyst is impregnated into a fibrous filler to which a hydrocarbon-based resin is adhered, whereby a composite material which has no impregnation unevenness and can give a composite material molded article having excellent strength can be obtained, and thus the present invention has been completed.

That is, the present invention provides a composite material obtained by impregnating a fibrous filler to which a hydrocarbon-based resin is attached with a polymerizable composition containing a cycloolefin monomer and a metathesis polymerization catalyst.

In the composite material of the present invention, the fibrous filler is preferably carbon fiber and/or glass fiber.

In the composite material of the present invention, the hydrocarbon-based resin is preferably a petroleum resin and/or a hydrogenation product of a petroleum resin.

In the composite material of the present invention, the hydrocarbon-based resin is preferably an alicyclic petroleum resin and/or a hydrogenation product of an alicyclic petroleum resin.

In the composite material of the present invention, the alicyclic petroleum resin is a resin obtained by polymerizing a cyclopentadiene-based monomer as a main component.

In the composite material of the present invention, the cycloolefin monomer is preferably a cycloolefin monomer without polar group.

In the composite material of the present invention, the cycloolefin monomer preferably contains dicyclopentadienes and cyclic olefins having four or more rings.

In the composite material of the present invention, the polymerizable composition further preferably contains at least one selected from a group consisting of a radical generator, a diisocyanate compound, and a polyfunctional (meth)acrylate compound.

Further, the present invention provides a composite material molded article obtained by curing the above composite material of the present invention.

Effects of Invention

According to the present invention, a composite material which has no impregnation unevenness and can give a composite material molded article having excellent strength can be provided.

DESCRIPTION OF EMBODIMENTS

In the present invention, in a composite material in which a polymerizable composition containing a cycloolefin monomer and a metathesis polymerization catalyst is impregnated into a fibrous filler, a hydrocarbon-based resin is used as a binder which is used in a preform of a fibrous filler.

Here, a sizing agent is imparted to carbon fiber as a representative example of a fibrous filler in consideration of fluffing and handling property. Also, since carbon fiber has properties similar to cloth, a preform is required to form a shape, and a binder is used in the preform. Generally, an epoxy resin is impregnated into carbon fiber, and therefore, a polyester resin is usually used as a binder. However, the cycloolefin monomer used in the present invention repels the polyester resin, and therefore, when the polymerizable composition containing the cycloolefin monomer is impregnated, there has been a case where the impregnation unevenness is caused and the obtained composite material molded article is inferior in strength.

On the other hand, when the present inventor has conducted intensive studies, it has been found that, by using a hydrocarbon-based resin as a binder which is used at the time of preform, it is possible to enhance affinity with a polymerizable composition containing a cycloolefin monomer and a metathesis polymerization catalyst, and thereby to provide a composite material capable of giving a composite material molded article having excellent strength, and thus, it has been found that the present invention has been completed.

The hydrocarbon-based resin used in the present invention refers to a resin in which a skeleton (main chain) of a resin is a hydrocarbon. The hydrocarbon-based resin is not particularly limited, the hydrocarbon-based resin classified as a tackifier resin is suitably used. Examples of the resin include an aliphatic petroleum resin (C5 petroleum resin), an aromatic petroleum resin (C9 petroleum resin), a copolymer petroleum resin (C5-C9 petroleum resin), an alicyclic petroleum resin (dicyclopentadiene-based petroleum resin), a styrene-butadiene copolymer (SB), a styrene-butadiene-styrene copolymer (SBS), a styrene-isoprene copolymer (SI), a styrene-isoprene-styrene copolymer (SIS), and a hydrogenation product thereof. Among these, a petroleum resin and a hydrogenation product thereof are preferred, and an alicyclic petroleum resin and a hydrogenation product thereof are more preferred because they are higher in affinity with a polymerizable composition containing a cycloolefin monomer and a metathesis polymerization catalyst.

As alicyclic petroleum resin, it is preferable that it is a resin polymerized by the cyclopentadiene-based monomer as a main component, and specific examples of a cyclopentadiene-based monomer include cyclopentadiene; alkyl substituted compounds of cyclopentadiene such as methylcyclopentadiene, ethylcyclo pentadiene; multimers of cyclopentadiene or alkyl substituted compounds of cyclopentadiene such as dicyclopentadiene, tricyclopentadiene, and methyldicyclopentadiene.

As the alicyclic petroleum resin, for example, commercial products such as “Quintone (registered trademark; hereinafter the same) 1105”, “Quintone 1325”, “Quintone 1340”, “Quintone 1500”, “Quintone 1525 L”, “Quintone 1920” and “Quintone 2940” can be suitably used as products manufactured by Zeon Corporation.

The molecular weight of the petroleum resin is not particularly limited, but the number average molecular weight (Mn) is usually in the range of 100 to 2500, the weight average molecular weight (Mw) is usually in the range of 500 to 5500, and the Z average molecular weight (Mz) is usually in the range of 1000 to 12000. In addition, the ratio (Mw/Mn) of the weight average molecular weight to the number average molecular weight is usually in the range of 1.0 to 4.0, and the ratio (Mz/Mw) of the Z average molecular weight to the weight average molecular weight is usually in the range of 1.0 to 4.0. The softening point of the petroleum resin is usually in the range of 70° C. to 170° C.

The petroleum resin can be produced according to conventional methods. For example, the petroleum resin can be produced by addition polymerization of monomer mixture using a Friedel-Crafts type cationic polymerization catalyst. There is no particular limitation on the method for preparing the monomer mixture, and each of the pure compounds may be mixed to obtain a targeted monomer mixture, or a mixture containing a targeted monomer which is derived from a fraction of a naphtha decomposition product or the like may be used to obtain a targeted monomer mixture. For example, in order to blend a 1,3-pentadiene or the like into a monomer mixture, a C5 fraction after extraction of isoprene and cyclopentadiene (including a multimer thereof) can be suitably used. Further, a hydrogenation product of a petroleum resin can be obtained by performing a hydrogenation reaction on thus obtained petroleum resin.

The amount of the hydrocarbon-based resin to be adhered to the fibrous filler is usually 0.1 to 5% by mass, preferably 0.2 to 3% by mass, and more preferably 0.5 to 2% by mass, in the total amount of the fibrous filler and the hydrocarbon-based resin. When the amount of adhesion falls within this range, appropriate adhesion between fibers is obtained, and the shape of the fibrous filler is maintained within a range that does not affect the physical properties of the obtained composite material molded article.

The contact between the fibrous filler and the hydrocarbon-based resin can be appropriately performed by a method generally used industrially, such as a method of a dropping above, a roller dipping method, and a roller contact method. Thus, the hydrocarbon-based resin adheres to the fibrous filler. In the contact between the fibrous filler and the hydrocarbon-based resin, usually, the hydrocarbon-based resin powder is sprinkled from above and heated and melted, or the dispersion or the solution is brought into contact, and then the solvent is removed by drying or the like. The drying step can be performed by a method using hot air, a hot plate, a roller, various infrared heaters, or the like as a heat medium. Alternatively, the fibrous filler and the hydrocarbon-based resin may be brought into contact with each other by hot melt coating in which the hydrocarbon-based resin is heated and melted and the hydrocarbon-based resin in the heated and melted state is applied to the fibrous filler surface.

Note that, the adhesion of the hydrocarbon-based resin to the fibrous filler is preferably performed after a sizing agent adhesion, which will be described later. When the sizing agent is not used, the adhesion of the hydrocarbon-based resin to the fibrous filler is preferably performed after an introduction of an active hydrogen-containing group on the surface of the carbon fiber or an introduction of the unevenness.

The fibrous filler used in the present invention is not particularly limited as long as it is used in the technical field of the present invention. From the viewpoint of availability and utility, the fibrous filler is preferably carbon fiber or glass fiber, and both of them may be used in combination. When carbon fiber and glass fiber are used in combination, the mixing ratio of both is not limited, but from a viewpoint of a mixing effect, 0.1 to 10 parts by mass of glass fiber is preferable with respect to 1 part by mass of carbon fiber.

The carbon fiber used in the present invention is not particularly limited, and various kinds of carbon fibers produced by conventionally known methods such as an acrylic based, a pitch based, and a rayon based can be arbitrarily used, for example. Among these, PAN-based carbon fiber produced using polyacrylonitrile fiber as a raw material is suitably used because PAN-based carbon fiber does not cause inhibition of the metathesis ring-opening polymerization reaction when a polymerizable composition described later is used, and characteristics such as mechanical strength and heat resistance can be improved in the obtained composite material molded article.

The basis weight of the carbon fiber is appropriately selected depending on the purpose of use, but is preferably from 50 to 500 g/$m^2$, more preferably from 100 to 400 g/$m^2$, and still more preferably from 200 to 300 g/$m^2$ from the viewpoint of resin filling property, fiber volume content ratio (Vf), and excipientness.

Since the higher the elastic modulus of the carbon fiber, the stiffness can be maintained, therefore using the carbon fiber can make thickness of the obtained composite material molded article thinner, which is preferable. On the other hand, if the elastic modulus is too high, the tensile elongation may be lowered. The carbon fiber preferably has a tensile modulus by the resin-impregnated strand tensile test (JIS R-7601) in the range of 200 to 400 GPa, and more preferably in the range of 220 to 300 GPa. Further, as the carbon fiber, those having high tensile elongation are preferred. The tensile elongation is preferably 1.7% or more, more preferably 1.85% or more, and still more preferably 2% or more. There is no particular upper limit to such tensile elongation, but it is usually 2.5% or less. The tensile elongation of the carbon fiber can be measured by the above-mentioned resin impregnated strand tensile test. The higher the tensile elongation of the carbon fiber, the stronger the fiber and the easier it is to handle, and the higher the mechanical strength of the obtained composite material molded article, which is preferable.

From the viewpoint of further improving the adhesion between the carbon fiber and a resin material when the polymerizable composition described later is used, an appropriate amount of an active hydrogen-containing group such as a carboxyl group and a hydroxyl group is preferably present on at least the surface of the carbon fiber. The amount of active hydrogen-containing group in the carbon fiber can be quantified by the surface oxygen concentration (O/C) measured by X-ray photoelectron spectroscopy. The amount of the active hydrogen-containing group of the carbon fiber is preferably 0.02 to 0.2 in terms of O/C. Within this range, the action of the active hydrogen reactive group contained in a cycloolefin monomer or a diisocyanate compound described later on the carbon fiber is increased, and the degree of oxidation of the surface of the carbon fiber is also appropriate, which is suitable. The amount of the active hydrogen-containing group of the carbon fiber is more preferably 0.04 to 0.15, and still more preferably 0.06 to 0.1 in terms of O/C.

The method of introducing the active hydrogen-containing group into the carbon fiber is not particularly limited, and a commonly used method may be appropriately employed. Although there is an ozone method, an electrolytic oxidation in an acid solution, or the like, an oxidation reaction in a solution is preferably because it is economically excellent. At this time, the amount of the active hydrogen-containing group can be appropriately adjusted by an amount of current, temperature, residence time in an acidic bath, acidity, and the like.

The surface state of the carbon fiber is not particularly limited, and may be smooth or uneven. Since an anchor effect can be expected, it is preferable to have unevenness. The degree of unevenness may be appropriately selected. Introduction of unevenness into the surface of the carbon fiber can be performed simultaneously during the above-described oxidation reaction in the solution, for example.

The cross-sectional shape of the carbon fiber is not particularly limited, but is preferably substantially circular. If the cross-sectional shape is circular, when the polymerizable composition is impregnated, rearrangement of the filaments tends to occur, and penetration of the polymerizable composition between the fibers becomes easy. In addition, thickness of the fiber bundle can be made thin, and a composite material having excellent drapability can be easily obtained. Incidentally, the state where the cross-sectional shape is substantially circular means that, when the ratio of the circumscribed circle radius “R” and the inscribed circle radius “r” of the cross section (R/r) is defined as the degree of deformation, the degree of deformation is 1.1 or less.

The length of the carbon fiber may be appropriately selected depending on the application, and any of short fiber and long fiber may be used. From the viewpoint of further enhancing mechanical strength of the obtained composite material molded article, the length of carbon fiber is usually 1 cm or more, preferably 2 cm or more, and more preferably 3 cm or more, and particularly preferably carbon fiber which is continuous fiber is used.

Although it is not necessary that the carbon fiber used in the present invention has a sizing agent adhered to it in advance, it is preferable to use a carbon fiber which is previously adhering a sizing agent from the viewpoint of preventing a defect in deterioration of physical properties after forming due to fiber fluffing and the viewpoint of further improving the adhesion between the cycloolefin polymer and the carbon fiber when the polymerizable composition described later is used.

There is no particular limitation on the sizing agent, and known sizing agents can be used. Examples of the sizing agent include at least one kind selected from the group consisting of an epoxy resin; a urethane resin; a vinyl ester resin; a polyamide resin; a polyolefin resin such as a nylon resin, polyethylene and polypropylene; polyester resin; and phenol resins. As the sizing agent, from the view point of easy availability, at least one kind selected from the group consisting of an epoxy resin, a urethane resin, a vinyl ester resin, and a polyolefin resin are preferred, and an epoxy resin and/or a vinyl ester resin are more preferred.

Examples of such sizing agents include, as all products manufactured by Matsumoto Yushi-Seiyaku Co., Ltd, sizing agents, such as KP-226, KP-0110, KP-136, KP-300, KP-752, and KP-1005; sizing agents composed of urethane resin, such as KP-2816, KP-2817, KP-2807, KP-2820 and KP-2821; sizing agents composed of vinyl ester resin, such as KP-371 and KP-372; sizing agents composed of nylon resin, such as KP-1008; sizing agents composed of polyethylene resin, such as P-138; sizing agents composed of polypropylene resin, such as TPE-100 and TPE-102; sizing agents composed of polyester resin, such as KP-880 and KP-881.

The adhesion of the sizing agent to the carbon fiber can be performed by bringing the sizing agent into contact with the carbon fiber. In this case, it is preferable to disperse or dissolve the sizing agent in water, or an organic solvent such as acetone, and use it as a dispersion or a solution thereof. From the viewpoint of enhancing dispersible of the sizing agent and improving liquid stability, it is preferable to add a surfactant as appropriate to the dispersion or solution.

The amount of the sizing agent to be adhered to the carbon fiber is usually 0.1 to 5% by mass, preferably 0.2 to 3% by mass, and more preferably 0.5 to 2% by mass, in the total amount of the carbon fiber and the sizing agent. When the amount of adhesion is within this range, moderate convergence of carbon fiber is obtained, sufficient scratch resistance of carbon fiber is obtained, and generation of fluff due to mechanical friction or the like is suppressed. In addition, impregnation property of the cycloolefin monomer in the polymerizable composition is improved, and mechanical strength in the obtained composite material molded article can be improved.

The contact between the carbon fiber and the sizing agent can be appropriately performed by a method generally used industrially, such as a roller dipping method and a roller contact method. Since the contact between the carbon fiber and the sizing agent is usually performed using a dispersion or solution of a sizing agent, after the contact, it is subjected to a drying step, and water or an organic solvent contained in the dispersion or solution of the sizing agent may be removed. The drying step can be performed by a method using hot air, a hot plate, a roller, various infrared heaters, or the like as a heat medium.

Note that, the adhesion of the sizing agent to the carbon fiber is preferably performed after the introduction of the active hydrogen-containing group on the surface of the carbon fiber and the introduction of the unevenness described above.

The adhesion of the hydrocarbon-based resin used as a binder to the carbon fiber in the present invention can be performed by bringing the hydrocarbon-based resin into contact with the carbon fiber. In this case, a powdery hydrocarbon-based resin may be sprinkled on the carbon fiber, and a hydrocarbon-based resin may be dispersed or dissolved in water or an organic solvent such as acetone, and used as a dispersion or solution. In addition, from the viewpoint of enhancing dispersible of the hydrocarbon-based resin and improving liquid stability, a surfactant may be added to the dispersion or solution as appropriate.

The amount of the hydrocarbon-based resin to be adhered to the carbon fiber is usually 0.1 to 5% by mass, preferably 0.2 to 3% by mass, and more preferably 0.5 to 2% by mass in the total amount of the carbon fiber and the hydrocarbon-based resin (in the total amount of the carbon fiber to which the sizing agent is adhered and the hydrocarbon-based resin when the sizing agent is adhered to the carbon fiber in advance). If the amount of adhesion falls within this range, a suitable shape retaining property can be obtained for imparting a shape (preform) to the fibers in advance.

The contact between the carbon fiber and the hydrocarbon-based resin can be appropriately performed by a method generally used industrially, such as a method of a dropping above, a roller dipping method, and a roller contact method. When a dispersion or solution of a hydrocarbon-based resin is used, it is sufficient that after the contact, the dispersion or solution of the hydrocarbon-based resin is subjected to a drying step, and water or an organic solvent contained in the dispersion or solution of the hydrocarbon-based resin is removed. The drying step can be performed by a method using hot air, a hot plate, a roller, various infrared heaters, or the like as a heat medium. Alternatively, the carbon fiber and the hydrocarbon resin may be brought into contact with each other by hot melt coating in which the hydrocarbon-based resin is heated and melted and the hydrocarbon-based resin in the heated and melted state is applied to the surface of the carbon fiber.

In addition, when the carbon fiber to which the sizing agent is adhered is used as the carbon fiber, it is preferable to employ a method in which the sizing agent is adhered to the carbon fiber and then a hydrocarbon-based resin is adhered to the carbon fiber to which the sizing agent is adhered.

The glass fiber used in the present invention is not particularly limited, and examples thereof include those having a shape such as a continuous fiber, a woven fabric, and a nonwoven fabric, and those having various thicknesses are available as commercially products. The shape and thickness of the glass fiber may be appropriately selected in accordance with the application of the obtained composite material molded article.

The basis weight of the glass fiber used in the present invention is appropriately selected according to the purpose of use, but is preferably 200 $g/m^2$ or more, more preferably 200 to 2000 $g/m^2$, and still more preferably 300 to 1800 $g/m^2$. If the basis weight of the glass fiber is excessively small, a gap is formed between adjacent glass fibers, and the mechanical strength of the obtained composite material molded article becomes insufficient. Whereas if the basis weight is excessively large, flexibility is lowered, or a portion where adjacent glass fibers overlap is formed, which tends to impair the impregnation property of the polymerizable composition.

It is preferable that the glass fiber is subjected to a hydrophobic treatment on its surface. By using a hydrophobized glass fiber, it is possible to uniformly disperse the glass fiber in the obtained composite material molded article, to make the rigidity and dimensional stability of the composite material molded article uniform, and to further reduce the anisotropy. Examples of the treatment agent used in the hydrophobization treatment include a silane coupling agent, a titanate coupling agent, an aluminum coupling agent, a fatty acid, an oil and fat, a surfactant, a wax, and other polymers. These treatment agents may also serve as sizing agents.

The amount of the hydrocarbon-based resin to be adhered to the glass fiber is usually 0.1 to 5% by mass, preferably 0.2 to 3% by mass, and more preferably 0.5 to 28 by mass in the total amount of the glass fiber and the hydrocarbon-based resin (corresponding to the case of carbon fiber). If the amount of adhesion of the hydrocarbon-based resin falls within this range, a suitable shape retaining property can be obtained for imparting a shape (preform) to the fiber in advance.

The contact between the glass fiber and the hydrocarbon-based resin used in the present invention can be appropriately performed by a method commonly used industrially, such as a method of an upper drop, a roller dipping method, and a roller contact method. Thus, the hydrocarbon-based resin adheres to the glass fiber. When a dispersion or solution of a hydrocarbon-based resin is used, it is sufficient that after the contact, the dispersion or solution of the hydrocarbon-based resin is subjected to a drying step, and water or an organic solvent contained in the dispersion or solution of the hydrocarbon-based resin is removed. The drying step can be performed by a method using hot air, a hot plate, a roller, various infrared heaters, or the like as a heat medium. Alternatively, the glass fiber and the hydrocarbon-based resin may be brought into contact with each other by hot melt coating in which the hydrocarbon-based resin is heated and melted and the hydrocarbon-based resin in the heated and melted state is applied to the glass fiber surface.

The form of the fibrous filler used in the present invention is not particularly limited, and may be appropriately selected from a unidirectional material in which a fibrous filler is aligned in one direction, a woven fabric, a nonwoven fabric, a mat, a knit, a braided string, a roving, a chopped, and the like. Among them, it is preferable to be in the form of a continuous fiber such as a unidirectional material, a fabric, and a roving, and a unidirectional material is more preferable. The unidirectional material can highly improve the impregnation property of a resin material, and also, since the ratio of the fibers is high, the mechanical strength of the obtained composite material molded article can be highly improved, which is suitable.

As a form of a fabric, conventionally known ones are available, and for example, all of a woven structure in which fibers are interlaced such as plain weave, satin weave, twill weave, and three axis fabric can be used. In addition, as a form of a fabric, not only a two dimensional but also a stitched fabric or a three dimensional fabric in which fibers are reinforced in thickness direction of a fabric can be used.

When a fibrous filler material is used in a fabric or the like, it is usually used as a fiber bundle yarn. The number of filaments in one fiber bundle yarns is not particularly limited, but is preferably in the range of 1,000 to 100,000, more preferably 5,000 to 50,000, and still more preferably 10,000 to 30,000.

Then, it is preferable that the hydrocarbon-based resin is melt-bonded by applying a heating pressure to the fibrous filler to which such a hydrocarbon-based resin is adhered, and then a desired shape is previously imparted before forming by removing the hot pressure. Although the degree of the heating pressure may be appropriately determined in view of the shape imparting, the temperature is preferably equal to or higher than the melting point of the hydrocarbon-based resin, and the pressure is preferably equal to or higher than 0.2 MPa as the projected pressure in the horizontal direction of the mold, more preferably equal to or higher than 0.5 MPa, and even more preferably equal to or higher than 1 MPa.

The fibrous filler used in the present invention can be molded using a mold made of, for example, metal such as aluminum, nickel electroforming, steel, and ZAS, epoxy resin, unsaturated polyester resin, dicyclopentadiene resin, or also resins in which metal powder, silica, or alumina is dispersed in these resins. The release agent to be applied to such a mold may be any of those commonly used, and a silicone type, a fluororesin type, or the like is used.

Then, a polymerizable composition containing a cycloolefin monomer and a metathesis polymerization catalyst is impregnated into the fibrous filler to which the above-described hydrocarbon-based resin is adhered, whereby a composite material of the present invention can be obtained. As a manufacturing method in this case, a desired forming method such as reactive injection molding (RIM), resin transfer molding (RTM), vacuum-assisted resin transfer molding (VaRTM), or the like can be used.

A cycloolefin monomer is a compound having an alicyclic structure and a carbon-carbon double bond in a molecule.

Examples of the alicyclic structure constituting the cycloolefin monomer include a monocyclic ring, a polycyclic ring, a condensed polycyclic ring, a bridged ring, and a combination polycyclic ring thereof. There is no particular limitation on the number of carbons constituting the alicyclic structure, but is usually 4 to 30, preferably 5 to 20, and more preferably 5 to 15.

Examples of the cycloolefin monomer include a monocyclic cycloolefin monomer and a norbornene-based monomer, and a norbornene-based monomer is preferred. The norbornene-based monomer is a cycloolefin monomer having a norbornene ring structure in its molecular. These may be substituted by a hydrocarbon group such as an alkyl group, an alkenyl group, an alkylidene group, and an aryl group, or a polar group or the like. In addition, the norbornene-based monomer may have a double bond other than the double bond of the norbornene ring.

Examples of the monocyclic cycloolefin monomer include cyclobutene, cyclopentene, cyclooctene, cyclododecene, cyclopentadiene, and 1,5-cyclooctadiene.

Specific examples of norbornene-based monomers include dicyclopentadienes such as dicyclopentadiene, and methyldicyclopantadiene;

tetracyclododecenes such as tetracyclo $[6.2.1.1^{3,6}.0^{2,7}]$ dodeca-4-ene, 9-ethylidene tetracyclo $[6.2.1.1^{3,6}.0^{2,7}]$ dodeca-4-ene, 9-phenyl tetracyclo $[6.2.1.1^{3,6}.0^{2,7}]$dodeca-4-ene, tetracyclo $[6.2.1.1^{3,6}.0^{2,7}]$dodeca-9-ene-4-carboxylic acid, and tetracyclo $[6.2.1.1^{3,6}.0^{2,7}]$dodeca-9-ene-4,5-dicarboxylic anhydride;

norbornenes such as 2-norbornene, 5-ethylidene-2-norbornene, 5-vinyl-2-norbornene, 5-phenyl-2-norbornene, 5-norbornene-2-yl acrylate, 5-norbornene-2-yl methacrylate, 5-norbornene-2-carboxylic acid, 5-norbornene-2,3-dicarboxylic acid, and 5-norbornene-2,3-dicarboxylic anhydride;

oxanorbornenes such as 7-oxa-2-norbornene and 5-ethylidene-7-oxa-2-norbornene;

four or more cyclic olefins such as tetracyclo $[9.2.1.0^{2,10}.0^{3,8}]$tetradeca-3,5,7,12-tetraene (also referred to as 1,4-methano-1,4,4a, 9a-tetrahydro-9H-fluorene), pentacyclo $[6.5.1.1^{3,6}.0^{2,7}.\ 0^{9,13}]$pentadeca-4,10-diene, pentacyclo $[9.2.1.0^{2,10}.0^{3,8}]$pentadeca-5,12-diene, and tricyclopentadiene.

Of these cycloolefin monomers, a cycloolefin monomer having no polar group is preferred because a molded article having low water absorption can be obtained. When a cycloolefin monomer having an aromatic condensed ring such as tetracyclo $[9.2.1.0^{2,10}.0^{3,8}]$tetradeca-3,5,7,12-tetraene or the like is used, the viscosity of the polymerizable composition can be lowered.

One kind of these cycloolefin monomers may be used alone, or two or more kinds thereof may be used in combination. By combining, the physical properties of the obtained cycloolefin-based resin can be appropriately adjusted.

Note that, in the polymerizable composition used in the present invention, any monomer copolymerizable with the above-described cycloolefin monomer may be contained as long as the expression of the effect of the present invention is not inhibited.

The metathesis polymerization catalyst used in the present invention is not particularly limited as long as it is capable of ring-opening polymerization of a cycloolefin monomer, and a known one can be used.

The metathesis polymerization catalyst used in the present invention is a complex containing a transition metal atom as a central atom to which a plurality of ions, atoms, polyatomic ions and/or compounds are bonded. As the transition metal atom, atoms of Groups 5, 6 and 8 (Long Periodic Table, hereinafter the same) are used. Although there is no particular limitation on the atoms of the respective groups, the atoms of Group 5 include, for example, tantalum, and the atoms of Group 6 include, for example, molybdenum and tungsten, and the atoms of Group 8 include, for example, ruthenium and osmium. Among these transition metal atoms, ruthenium and osmium of Group 8 are preferred. In other words, as the metathesis polymerization catalyst used in the present invention, a complex containing ruthenium or osmium as a central atom is preferred, and a complex containing ruthenium as a central atom is more preferred. As a complex containing ruthenium as a central atom, a ruthenium carbene complex in which a carbene compound is coordinated to ruthenium is preferred. Here, the term "carbene compound" is a generic name for a compound having a methylene free radical, and refers to a compound having a bivalent carbon atom (carbene carbon) having no charge as represented by (>C:). Since the ruthenium carbene complex is excellent in catalytic activity during bulk ring-opening polymerization, the obtained polymer is low odor derived from an unreacted monomer and the polymer can be obtained with a good productivity. Further, it is relatively stable against oxygen and moisture in air, and is hardly deactivated, so that it can be used even in air. As the metathesis polymerization catalyst, only one kind may be used, and a plurality of kinds may be used in combination.

Examples of the ruthenium carbene complex include those represented by the following general formula (1) or general formula (2).

(1)

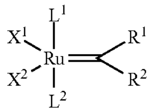

(2)

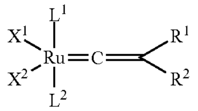

In general formulas (1) and (2) above, $R^1$ and $R^2$ are independently a hydrogen atom; a halogen atom; or an organic group having 1 to 20 carbon atoms which may contain a halogen atom, an oxygen atom, a sulfur atom, a phosphorus atom, or a silicon atom; these groups may be substituted or not substituted or may be bonded to each other to form a ring. Examples in which $R^1$ and $R^2$ are bonded to each other to form a ring include an indenylidene group which may have a substituent, such as a phenylindenylidene group.

As specific examples of the organic group having 1 to 20 carbon atoms which may contain a halogen atom, an oxygen atom, a sulfur atom, a phosphorus atom, or a silicon atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, an alkylthio group having 1 to 8 carbon atoms, carbonyloxy group, an alkoxycarbonyl group having 1 to 20 carbon atoms, an alkylsulfonyl group having 1 to 20 carbon atoms, an alkylsulfinyl group having 1 to 20 carbon atoms, an alkylsulfonic acid group having 1 to 20 carbon atoms, an arylsulfonic acid group having 6 to 20 carbon atoms, sulfonic acid group, an arylphosphonic acid group having 6 to 20 carbon atoms, an alkylammonium group having 1 to 20 carbon atoms, an arylammonium group having 6 to 20 carbon atoms, and the like may be mentioned. These organic group having 1 to 20 carbon atoms which may contain a halogen atom, an oxygen atom, a sulfur atom, a phosphorus atom, or a silicon atom may be substituted or not substituted. Examples of the substituent include an alkyl group having 1 to 10 carbon atoms, an alkoxy group having 1 to 10 carbon atoms, and an aryl group having 6 to 10 carbon atoms.

$X^1$ and $X^2$ each independently represent any anionic ligand. The anionic ligand is a ligand having a negative charge when separated from a central metal atom, and examples thereof include a halogen atom, a diketonate group, a substituted cyclopentadienyl group, an alkoxyl group, an aryloxy group, a carboxyl group, and the like.

$L^1$ and $L^2$ represent a heteroatom-containing carbene compound or a neutral electron-donating compound other than the heteroatom-containing carbene compound. The neutral electron-donating compound other than the heteroatom-containing carbene compound and heteroatom-containing carbene compound are compounds having a neutral charge when separated from a central metal atom. From the viewpoint of improving the catalytic activity, a heteroatom-containing carbene compound is preferred. The heteroatom means atoms of Groups 15 and 16 of the Periodic Table, and specifically, a nitrogen atom, an oxygen atom, a phosphorus atom, a sulfur atom, an arsenic atom, a selenium atom, and the like may be mentioned. Of these, from the viewpoint of obtaining a stable carbene compound, a nitrogen atom, an oxygen atom, a phosphorus atom, and a sulfur atom are preferred, and a nitrogen atom is more preferred.

As the heteroatom-containing carbene compound, a compound represented by the following general formula (3) or (4) is preferred, and from the viewpoint of improving catalytic activity, a compound represented by the following general formula (3) is further preferred.

(3)

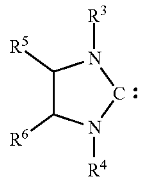

(4)

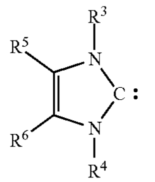

In the general formulas (3) and (4) above, $R^3$, $R^4$, $R^5$ and $R^6$ represent, respectively, independently a hydrogen atom; a halogen atom; or an organic group having 1 to 20 carbon atoms which may contain a halogen atom, an oxygen atom, a sulfur atom, a phosphorus atom, or a silicon atom. Specific examples of the organic group having 1 to 20 carbon atoms which may contain a halogen atom, an oxygen atom, a sulfur atom, a phosphorus atom, or a silicon atom are the same as those of the general formulas (1) and (2) above.

$R^3$, $R^4$, $R^5$ and $R^6$ may also be bonded to each other in any combination to form a ring.

Since the effect of the present invention becomes more prominent, it is preferable that $R^5$ and $R^6$ are hydrogen atoms. $R^3$ and $R^4$ are preferably an aryl group which may be substituted or not substituted, more preferably a phenyl group having alkyl group having 1 to 10 carbon atoms as substituents, and more preferably a mesityl group.

Examples of the neutral electron-donating compound include an oxygen atom, water, carbonyls, ethers, nitriles, esters, phosphines, phosphinites, phosphites, sulfoxides, thioethers, amides, imines, aromatics, cyclic diolefins, olefins, isocyanides, and thiocyanates.

In the general formulas (1) and (2), $R^1$, $R^2$, $X^1$, $X^2$, $L^1$ and $L^2$ may be alone and/or bonded to each other in any combination to form a multidentate chelating ligand.

Further, as the ruthenium carbene complex used in the present invention, a compound represented by the above general formula (1) is preferred from the viewpoint that the effect of the present invention becomes more remarkable among the compounds represented by the above general formula (1) or (2), and among them, a compound represented by the following general formula (5) or general formula (6) is more preferred.

The general formula (5) is shown below.

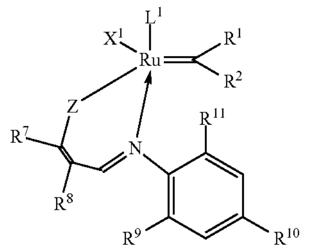

(5)

In the general formula (5), Z is an oxygen atom, a sulfur atom, a selenium atom, $NR^{12}$, $PR^{12}$ or $AsR^{12}$, and $R^{12}$ is a hydrogen atom; or an organic group having 1 to 20 carbon atoms which may contain a halogen atom, an oxygen atom, a sulfur atom, a phosphorus atom, or a silicon atom; however, as Z, an oxygen atom is preferred because the effect of the present invention becomes more pronounced.

$R^1$, $R^2$, $X^1$ and $L^1$ are the same as in the general formulas (1) and (2), and may be alone and/or bonded to each other in any combination to form a multidentate chelating ligand. However, it is preferable that $X^1$ and $L^1$ do not form a multidentate chelating ligand, that $R^1$ and $R^2$ are bonded to each other to form a ring, more preferably an indenylidene group which may be substituted or not substituted, and even more preferably a phenylindenylidene group.

Further, specific examples of the organic group having 1 to 20 carbon atoms which may contain a halogen atom, an oxygen atom, a sulfur atom, a phosphorus atom, or a silicon atom are the same as those of the general formulas (1) and (2) above.

In the above general formula (5), $R^7$ and $R^8$ represent, respectively, independently a hydrogen atom, an alkyl group having 1 to 20 carbon atoms, an alkenyl group having 2 to 20 carbon atoms, or a heteroaryl group having 6 to 20 carbon atoms, and these groups may be substituted or not substituted or may be bonded to each other to form a ring. Examples of the substituent may include an alkyl group having 1 to 10 carbon atoms, an alkoxy group having 1 to 10 carbon atoms or an aryl group having 6 to 10 carbon atoms, and the ring in the case of forming a ring may be any of an aromatic ring, an alicyclic ring and a heterocyclic ring, but it is preferable to form an aromatic ring, it is more preferable to form an aromatic ring having 6 to 20 carbon atoms, and it is further preferable to form an aromatic ring having 6 to 10 carbon atoms.

In the above general formula (5), $R^9$, $R^{10}$ and $R^{11}$ represent, respectively, independently a hydrogen atom; a halogen atom; or an organic group having 1 to 20 carbon atoms which may contain a halogen atom, an oxygen atom, a sulfur atom, a phosphorus atom, or a silicon atom; these groups may be substituted or not substituted or may be bonded to each other to form a ring. Specific examples of the organic group having 1 to 20 carbon atoms which may contain a halogen atom, an oxygen atom, a sulfur atom, a phosphorus atom, or a silicon atom are the same as those of the general formulas (1) and (2) above.

$R^9$, $R^{10}$ and $R^{11}$ are preferably a hydrogen atom or an alkyl group having 1 to 20 carbon atoms, more preferably a hydrogen atom or an alkyl group having 1 to 3 carbon atoms.

Specific examples of the compound represented by the above general formula (5) and a method for producing the same include those described in, for example, International Publication No. 03/062253 (JP-A-2005-515260).

The general formula (6) is shown below.

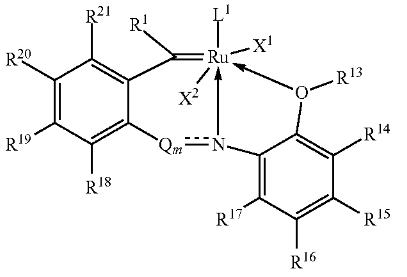

(6)

In the above general formula (6), "m" is 0 or 1, "m" is preferably 1, where "Q" is an oxygen atom, a nitrogen atom, a sulfur atom, a methylene group, an ethylene group or a carbonyl group and preferably a methylene group.

In the above general formula (6),

---- is a single bond or a double bond, and is preferably a single bond.

$R^1$, $X^1$, $X^2$ and $L^1$ are the same as in the general formulas (1) and (2), and may be alone and/or bonded to each other in any combination to form a multidentate chelating ligand. However, it is preferable that $X^1$, $X^2$ and $L^1$ do not form a multidentate chelating ligand and $R^1$ is a hydrogen atom.

$R^{13}$ to $R^{21}$ represents a hydrogen atom; a halogen atom; or an organic group having 1 to 20 carbon atoms which may contain a halogen atom, an oxygen atom, a sulfur atom, a phosphorus atom, or a silicon atom; these groups may be substituted or not substituted or may be bonded to each other to form a ring. Specific examples of the organic group having 1 to 20 carbon atoms which may contain a halogen atom, an oxygen atom, a sulfur atom, a phosphorus atom, or a silicon atom are the same as those of the general formulas (1) and (2) above.

$R^{13}$ is preferably an alkyl group having 1 to 20 carbon atoms, more preferably an alkyl group having 1 to 3 carbon atoms, $R^{14}$ to $R^{17}$ are preferably a hydrogen atom, and $R^{18}$ to $R^{21}$ is preferably a hydrogen atom or a halogen atom.

Specific examples of the compound represented by the above general formula (6) and a method for producing the same include those described in, for example, International Publication No. 11/079799 (JP-A-2013-516392), and the like.

In addition, as the compound represented by the above general formula (1), in addition to the compound represented by the above general formula (5) or the general formula (6), the following compound (7) can be suitably used. In compound (7), $PCy_3$ represents tricyclohexylphosphine and Mes represents a mesityl group.

(7)

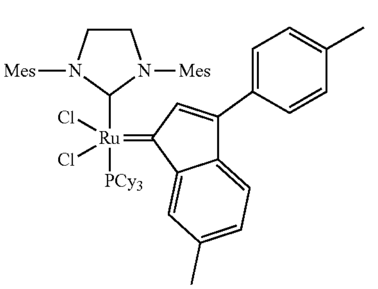

The content of the metathesis polymerization catalyst is preferably 0.005 mmol or more, more preferably 0.01 to 50 mmol, and still more preferably 0.015 to 20 mmol with respect to 1 mol of the total cycloolefin monomer used in the reaction.

In the polymerizable composition, a radical generator, a diisocyanate compound, a polyfunctional (meth)acrylate compound, and other optional components may be included if necessary.

The radical generator generates a radical by heating, thereby having an action of inducing a cross-linking reaction in a cycloolefin-based resin. The site where the radical generator induces a cross-linking reaction is mainly a carbon-carbon double bond of a cycloolefin-based resin, but cross-linking may occur even at a saturated bond portion.

Examples of the radical generator include an organic peroxide, a diazo compound, and a nonpolar radical generator. The organic peroxides include, for example, hydroperoxides such as t-butylhydroperoxide, p-menthane hydroperoxide, cumene hydroperoxide; dialkyl peroxides such as di-t-butylperoxide, dicumylperoxide, and t-butylcumylperoxide; diacylperoxides such as dipropionyl peroxide and benzoylperoxide; peroxyketals such as 2,5-dimethyl-2,5-di (t-butylperoxy) hexane, 2,5-dimethyl-2,5-di(t-butylperoxy)-3-hexine, 1,3-di(t-butylperoxyisopropyl) benzene; peroxyesters such as t-butylperoxyacetate, t-butylperoxybenzoate; peroxycarbonates such as t-butylperoxyisopropyl carbonate and di(isopropylperoxy)dicarbonate; alkylsilyl peroxides such as t-butyltrimethylsilyl peroxide. Among them, dialkyl peroxides are preferred in particular in terms of small obstacle to the metathesis polymerization reaction in bulk polymerization.

Diazo compounds include, for example, 4,4'-bisazidebenzal (4-methyl)cyclohexanone, 4,4'-diazidechalcone, 2,6-bis (4'-azidebenzal)cyclohexanone, 2,6-bis(4'-azidebenzal)-4-methylcyclohexanone, 4,4'-diazidediphenylsulfone, 4,4'-diazidediphenylmethane, 2,2'-diazidestilbene, and the like.

Nonpolar radical generators include 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane, 1,1,1-tripheny-2-propene, 1,1,1-tripheny-4-pentane, 1,1,1-tripheny-2-phenylethane.

The amount of the radical generator in the polymerizable composition is usually 0.1 to 10 parts by mass, preferably 0.5 to 5 parts by mass with respect to 100 parts by mass of the total cycloolefin monomer to be used.

Diisocyanate compounds include, for example, aromatic diisocyanate compounds such as methylenediphenyl 4,4'-diisocyanate (MDI), toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, and tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanate compounds such as methylene diisocyanate, 1,4-tetramethylene diisocyanate, 1,6-hexamethylene diisocyanate, and 1,10-decamethylene diisocyanate; alicyclic diisocyanate such as 4-cyclohexylene diisocyanate, 4,4'-methylenebis (cyclohexyl isocyanate), 1,5-tetrahydronaphthalene diisocyanate, isophorone diisocyanate, hydrogenated MDI, and hydrogenated XDI, and the like; polyurethane prepolymer obtained by reacting these diisocyanate compounds with a polyol or a polyamine having a low molecular weight so that the terminal becomes an isocyanate, and the like. In addition, those having a polyfunctional isocyanate group in which these compounds are isocyanurate forms, burette forms, adduct forms, or polymeric forms, and conventionally used known ones can be used without any particular limitation. These may include, for example, dimers of 2,4-tolylene diisocyanate, triphenylmethane triisocyanate, tris-(p-isocyanate phenyl)thiophosphite, polyfunctional aromatic isocyanate compounds, polyfunctional aromatic aliphatic isocyanate compounds, polyfunctional aliphatic isocyanate compounds, fatty acid-modified polyfunctional aliphatic isocyanate compounds, polyfunctional block type isocyanate compounds such as blocked polyfunctional aliphatic isocyanate compounds, polyisocyanate prepolymers, and the like. Among these, an aromatic diisocyanate compound, an aliphatic diisocyanate compound, and an alicyclic diisocyanate compound, which are polyfunctional non-blocked isocyanate compounds, are suitably used because of their excellent availability and ease of handling.

Each of these compounds may be used alone or in combination of two or more thereof.

Note that, the polyfunctional block type isocyanate compound is a compound in which at least two isocyanate groups in the molecule are reacted with an active hydrogen-containing compound so as to be inactive at ordinary temperature. The polyfunctional block type isocyanate compounds generally have a structure in which isocyanate groups are masked by blocking agents such as alcohols, phenols, ε-caprolactam, oximes, and active methylene compounds. The polyfunctional block type isocyanate compound is generally excellent in storage stability because it does not react at ordinary temperature, but the isocyanate group is usually regenerated by heating between 140 and 200° C., which can exhibit excellent reactivity.

It is considered that the diisocyanate compound serves to improve adhesion between the cycloolefin-based resin and the fibrous filler due to that the active hydrogen reactive group in the molecule forms a chemical bond with a hydroxyl group present in the polyfunctional (meth)acrylate compound when the polyfunctional (meth)acrylate compound is used in combination, a hydroxyl group on the surface of the fibrous filler, a hydroxyl group of the cycloolefin-based resin, and the like.

Each of the diisocyanate compounds may be used alone or in combination of two or more thereof. The amount of the diisocyanate compound to be blended into the polymerizable composition used in the present invention is preferably 0.5 to 20 parts by mass, more preferably 1 to 15 parts by mass, and still more preferably 2 to 10 parts by mass, with respect to 100 parts by mass of the total cycloolefin monomer. Within this range, it is possible to achieve both adhesion between the fibrous filler and the resin while also controlling the strength and heat resistance of the resin, which is preferable.

From the viewpoint of enhancing the adhesion of the fibrous filler and improving the mechanical strength of the obtained composite material molded article, a polyfunctional (meth)acrylate compound may be used. It is presumed that the use of the polyfunctional (meth)acrylate compound together with a diisocyanate compound synergistically enhances the function of the diisocyanate compound as an adhesion improving agent or an adhesion imparting agent. Preferred Examples of the polyfunctional (meth) acrylate compound include ethylene glycol dimethacrylate, triethylene glycol dimethacrylate, trimethylolpropane trimethacrylate, and neopentylglycol dimethacrylate.

The polyfunctional (meth) acrylate compounds may be used alone or in combination of two or more thereof. The amount of the polyfunctional (meth)acrylate compound to be blended is preferably 0.5 to 20 parts by mass, more preferably 1 to 15 parts by mass, and still more preferably 2 to 10 parts by mass with respect to 100 parts by mass of the total cycloolefin monomer to be used. Within this range, the function of the diisocyanate compound as an adhesion improving agent or an adhesion imparting agent is synergistically enhanced, and the adhesion between the cycloolefin-based resin and the fibrous filler becomes excellent, which is preferable.

Other optional components include an active agent, an activity regulator, an elastomer, an antioxidant, and the like.

The active agent is a compound which acts as a co-catalyst of the metathesis polymerization catalyst described above and improves the polymerization activity of the catalyst. As the active agent, for example, alkylaluminum halides such as ethylaluminum dichloride and diethylaminium chloride; alkoxyalkylaluminum halides in which a part of an alkyl group is substituted with an alkoxy group of these alkylaluminum halides; organotin compounds and the like are used. The amount of the active agent to be used is not particularly limited, but is usually preferably 0.1 to 100 mol, more preferably 1 to 10 mol with respect to 1 mol of the total metathesis polymerization catalyst used in the polymerizable composition.

The activity regulator is used for preventing polymerization from initiating in the middle of injection when a polymerizable composition is prepared by mixing two or more reaction stock solutions as described later and injected into a mold to initiate polymerization.

Examples of the activity regulator when a compound of a transition metal of Group 5 or 6 of the Periodic Table is used as a metathesis polymerization catalyst include a compound having an action of reducing a metathesis polymerization catalyst, and alcohols, haloalcohols, esters, ether, nitriles, and the like can be used. Among them, alcohols and haloalcohols are preferred, and haloalcohols are more preferred.

Specific examples of the alcohols include n-propanol, n-butanol, n-hexanol, 2-butanol, isobutyl alcohol, isopropyl alcohol, and t-butyl alcohol. Specific examples of the haloalcohols include 1,3-dichloro-2-propanol, 2-chloroethanol, and 1-chlorobutanol.

Examples of the activity regulator when the ruthenium carbene complex is used as the metathesis polymerization catalyst include a Lewis base compound. Lewis base compounds include Lewis base compounds containing phosphorus atoms such as tricyclopentylphosphine, tricyclohexylphosphine, triphenylphosphine, triphenylphosphite, and n-butylphosphine; Lewis base compounds containing nitrogen atoms such as n-butylamine, pyridine, 4-vinylpyridine, acetonitrile, ethylenediamine, N-benzylidenenemethylamine, pyrazine, piperidine, and imidazole, and the like. Also, norbornenes substituted with alkenyl groups, such as vinyl norbornene, propenyl norbornene and isopropenyl norbornene, are the aforementioned cycloolefin monomer as well as serve as the active regulator. The amount of these active regulators to be used may be appropriately adjusted depending on the compound used.

Examples of the elastomer include natural rubber, polybutadiene, polyisoprene, styrene-butadiene copolymer (SBR), styrene-butadiene-styrene copolymer (SBS), styrene-isoprene-styrene copolymer (SIS), ethylene-propylene-diene terpolymer (EPDM), ethylene-vinyl acetate copolymer (EVA), and hydrogenation products thereof. By using the elastomer dissolved in the polymerizable composition, its viscosity can be adjusted. Further, by adding the elastomer, the impact resistance of the obtained composite material molded article can be improved. The amount of the elastomer to be used is preferably 0.5 to 20 parts by mass, more preferably 2 to 10 parts by mass with respect to 100 parts by mass of the total cycloolefin monomer in the polymerizable composition.

Examples of the antioxidant include various kinds of antioxidants for plastics and rubbers such as phenol type, phosphorus type, and amine type.

The polymerizable composition used in the present invention is prepared by appropriately mixing each of the above components according to a known method, and may be prepared by mixing two or more reaction stock solutions using a mixing apparatus or the like immediately before impregnation into a fibrous filler to which a hydrocarbon-based resin is adhered. The reaction stock solution is prepared by dividing each of the above components into two or more solutions so that the reaction stock solution does not undergo bulk polymerization only by the one solution, but when all of the solutions are mixed, a polymerizable composition containing each component in a predetermined ratio is obtained. As a combination of such two or more reaction stock solutions, two kinds of the following (a) and (b) may be mentioned depending on the type of the metathesis polymerization catalyst used.

(a): As the metathesis polymerization catalyst, one which does not have a polymerization reaction activity by itself, but which exhibits a polymerization reaction activity by using an active agent in combination can be used. In this case, a polymerizable composition can be obtained by using a reaction stock solution (solution A) containing a cycloolefin monomer and an active agent and a reaction stock solution (solution B) containing a cycloolefin monomer and a metathesis polymerization catalyst, and mixing them. Further, a reaction stock solution (solution C) containing a cycloolefin monomer and containing neither a metathesis polymerization catalyst nor an active agent may be used in combination.

(b): In addition, when one having a polymerization reaction activity alone is used as the metathesis polymerization catalyst, a polymerizable composition can be obtained by mixing a reaction stock solution (i) containing a cycloolefin monomer and a reaction stock solution (ii) containing a metathesis polymerization catalyst. At this time, as the reaction stock solution (ii), a solution obtained by dissolving or dispersing a metathesis polymerization catalyst in a small amount of an inert solvent is usually used. As such a solvent, Examples thereof include aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichloromethane, dimethyl sulfoxide, and ethyl acetate, but aromatic hydrocarbons are preferred, and toluene is more preferred.

An optional component such as a radical generator, a diisocyanate compound, and a polyfunctional (meth)acrylate compound may be contained in any of the reaction stock solutions, or may be added in the form of a mixed solution other than the reaction stock solution.

Examples of the mixing apparatus used for mixing the reaction stock solution include a low-pressure mixer such as a dynamic mixer and a static mixer, in addition to a collision mixing apparatus generally used in a reaction injection molding method.

In addition, in order to promote impregnate into the fibrous filler layer, the polymerizable composition preferably has a viscosity of 0.2 Pa·s or less at 20° C. Viscosity is measured by a B-type viscometer.

Note that, in consideration of the use of a pigment for coloring, durability after molding, and the like, additives such as an antioxidant, a flame retardant, a heat stabilizer, an ultraviolet absorber, and a light stabilizer may be appropriately blended into the polymerizable composition.

Then, according to the present invention, a composite material molded article can be obtained by completely curing or semi-curing a polymerizable composition in a composite material obtained by impregnating a polymerizable composition in this manner into a fibrous filler to which a hydrocarbon-based resin is adhered. The method of curing the polymerizable composition is not particularly limited and may be selected depending on the composition of the monomer contained in the polymerizable composition and the type of the metathesis polymerization catalyst, and examples thereof include a method in which the polymerizable composition is impregnated and then left at room temperature, and a method in which the polymerizable composition is heated to a predetermined temperature.

EXAMPLES

Hereinafter, the present invention will be described based on Examples, but the present invention is not limited by the Examples. Note that, "parts" and "%" are based on mass unless otherwise specified.

<Preparation of Carbon Fiber Attached with Petroleum Resin>

0.15 g of a petroleum resin (product name "Quinton (registered trademark) 1105", manufactured by Zeon Corporation, polymerized alicyclic petroleum resin mainly containing dicyclopentadiene, softening point=107° C., Mn=270, Mw=800, Mz=2300) as a binder was powdered and uniformly sprinkled on the surface of a unidirectional carbon fiber (product name "SNU1230M", manufactured by Magic Box Corporation, containing sizing agent, basis weight of 200 g/$m^2$) cut to a length of 300 mm and a width of 250 mm, so that a laminate of unidirectional carbon fiber and petroleum resin was obtained. Then, eight laminates obtained by performing the same operation above were prepared and laminated in the same direction, and an iron heated to 120° C. from above was pressed uniformly to weld the entire, thereby preparing a carbon fiber to which a petroleum resin was adhered.

<Production Example of Composite Material Molded Article>

The carbon fiber to which the petroleum resin was adhered which was obtained as described above was placed in a mold made of aluminum 5052 having an inner length of 300 mm, a width of 250 mm, and a depth of 4 mm, which had been subjected to mold release treatment. Here, since the carbon fiber to which the petroleum resin was adhered which was obtained as described above was obtained by laminating the unidirectional material in the same direction, the composite material molded article obtained after molding and curing became a unidirectional material. The mold was set at 40° C., and then set at 20° C.

Then, a release film (product name "Dahlar (registered trademark)", manufactured by AirTech Co., Ltd.), a resin flow agent (product name "Greenflow (registered trademark)", manufactured by AirTech Co., Ltd.), and an airtight film (product name "IPPLON (registered trademark) KM1300", manufactured by AirTech Co., Ltd.) were laminated in this order on the carbon fiber to which the petroleum resin was adhered which was placed in the mold, and the back surface of the airtight film as the uppermost layer and the aluminum mold were bonded by an adhesive tape (product name "AT200-Y (registered trademark)", manufactured by AirTech Co., Ltd.), thereby forming an airtight space, and then the inside of the airtight space was reduced to 100 Pa using an oil pump.

32 g of a polymerizable composition (viscosity (20° C.):10 mPa·s), the polymerizable composition containing 100 parts of RIM monomer (manufactured by Zeon Corporation) set at 20° C., 5 parts of trimethylolpropane trimethacrylate (TMPT), 5 parts of methylenediphenyl 4,4'-diisocyanate, 1.7 parts of di-t-butylperoxide (product name "Kayabutyl D (registered trademark)", manufactured by Kayaku Akzo Co., Ltd.), and 0.04 parts of the above compound (7) as a metathesis polymerization catalyst, were introduced into the entire an integral object (hereinafter referred to as "mold") which was obtained above, so that the polymerizable composition was impregnated into the carbon fiber to which the petroleum resin was adhered. In this case, the mold was set at 40° C. The vacuum line and the composition introduction line were occluded and the mold was left for 1 hours. Subsequently, the mold was heated to 90° C. and left to stand for 0.5 hours, and then further heated to 200° C. and left to stand for 1 hour, thereby obtaining a composite material molded article.

When the obtained composite material molded article was confirmed, the impregnation property of the polymerizable composition was good in the composite material molded article, and there was no uneven impregnation by visual observation, and no foam or void was observed. For this reason, the obtained composite material molded article was effectively suppressed from lowering in strength due to uneven impregnate, and was excellent in bending strength (measured by JIS K7017). On the other hand, as a comparative, a composite material molded article was obtained in the same manner as described above except that a polyester resin was used as a binder, but uneven impregnate was observed, which was inferior in flexural strength as compared with a case where the above petroleum resin was used as a binder. Note that, the composition of the RIM monomer described above consisted of about 90 parts of dicyclopentadiene and about 10 parts of tricyclopentadiene, and the amount of the metathesis polymerization catalyst to be used was 0.055 mmol with respect to 1 mol of the total of cycloolefin monomers.

The invention claimed is:

1. A composite material molded article obtained by curing a composite material, wherein the composite material is obtained by impregnating a preform of a fibrous filler with a polymerizable composition, the preform of the fibrous filler comprises the fibrous filler and a hydrocarbon-based resin as a binder, and the polymerizable composition contains a cycloolefin monomer and a metathesis polymerization catalyst.

2. The composite material molded article according to claim 1, wherein the fibrous filler is carbon fiber and/or glass fiber.

3. The composite material molded article according to claim 1, wherein the hydrocarbon-based resin is a petroleum resin and/or a hydrogenation product of a petroleum resin.

4. The composite material molded article according to claim 1, wherein the hydrocarbon-based resin is an alicyclic petroleum resin and/or a hydrogenation product of an alicyclic petroleum resin.

5. The composite material molded article according to claim 4, wherein the alicyclic petroleum resin is a resin obtained by polymerizing a cyclopentadiene-based monomer as a main component.

6. The composite material molded article according to claim 1, wherein the cycloolefin monomer is a cycloolefin monomer without polar group.

7. The composite material molded article according to claim 1, wherein the cycloolefin monomer contains dicyclopentadienes and cyclic olefins having four or more rings.

8. The composite material molded article according to claim 1, wherein the polymerizable composition further contains at least one selected from a group consisting of a radical generator, a diisocyanate compound, and a polyfunctional (meth)acrylate compound.

* * * * *